(12) United States Patent
Fröjdh

(10) Patent No.: US 6,307,915 B1
(45) Date of Patent: Oct. 23, 2001

(54) TRIGGERING OF SOLID STATE X-RAY IMAGERS WITH NON-DESTRUCTIVE READOUT CAPABILITY

(75) Inventor: Christer Fröjdh, Sundsvall (SE)

(73) Assignee: AFP Imaging Corporation, Elmsford, NY (US)

( * ) Notice: Subject to any disclaimer, the term of this patent is extended or adjusted under 35 U.S.C. 154(b) by 0 days.

(21) Appl. No.: 09/603,395

(22) Filed: Jun. 26, 2000

(51) Int. Cl.⁷ ....................................................... H05G 1/64
(52) U.S. Cl. .............................................. 378/98.8; 378/19
(58) Field of Search ................................ 378/98.8, 98.7, 378/95, 19, 96

(56) References Cited

U.S. PATENT DOCUMENTS

| | | |
|---|---|---|
| 4,160,997 | 7/1979 | Schwartz . |
| 4,593,400 | 6/1986 | Mouyen . |
| 5,331,166 | 7/1994 | Yamamoto et al. . |
| 5,434,418 | 7/1995 | Schick . |
| 5,444,756 | 8/1995 | Pai et al. . |
| 5,510,623 | 4/1996 | Sayag et al. . |
| 5,513,252 | 4/1996 | Blaschka et al. . |
| 5,519,437 | 5/1996 | Nelvig . |
| 5,572,566 | 11/1996 | Suzuki et al. . |
| 5,579,361 | 11/1996 | Augais et al. . |
| 5,671,738 | 9/1997 | Thörnberg . |
| 5,693,948 | 12/1997 | Sayed et al. . |
| 5,694,448 | 12/1997 | Morcom . |
| 5,744,806 | 4/1998 | Fröjd . |
| 5,894,129 | 4/1999 | Pool . |
| 5,912,942 | 6/1999 | Schick et al. . |
| 6,002,742 | 12/1999 | Nelvig . |
| 6,021,172 | 2/2000 | Fossum et al. . |
| 6,084,229 | 6/2000 | Pace et al. . |
| 6,219,409 | * 4/2001 | Inoue ................................... 378/98.8 |
| 6,248,990 | * 6/2001 | Pyyhtia et al. .................... 250/208.1 |

* cited by examiner

Primary Examiner—Robert H. Kim
Assistant Examiner—Irakli Kiknadze
(74) Attorney, Agent, or Firm—Cooper & Dunham LLP

(57) ABSTRACT

A number of randomly distributed pixels in a solid state X-ray imager are designated reference pixels. The distribution of reference pixels may be either totally random or in a limited number of rows or columns. The reference pixels may include predetermined pixels or pixel like elements located in rows or columns distributed in at least two different locations on the sensor. The reference pixels are well distributed to avoid missed exposures due to shading of the reference pixels by dense objects. To determine commencement of exposure the reference pixels are continuously monitored for signal. If the signal level in a predetermined minimum number of pixels exceeds the predetermined threshold, an image capture sequence starts. Otherwise, the entire image sensor is cleared and the signal monitoring continues. The threshold level is set to prevent accidental triggering by dark current at all operating temperatures of interest. Image readout is either initiated after waiting a fixed amount of time or by monitoring the change in the accumulated signal at the reference pixels. If the signal no longer changes then it is determined that the X-ray pulse has terminated and readout can be initiated.

12 Claims, 5 Drawing Sheets

FIG. 1
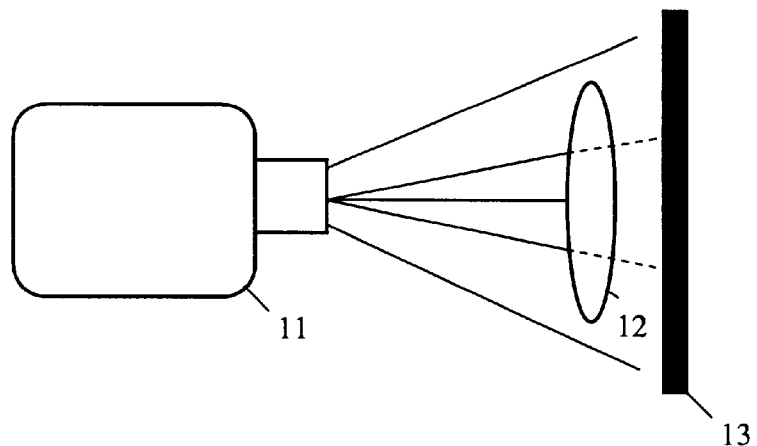
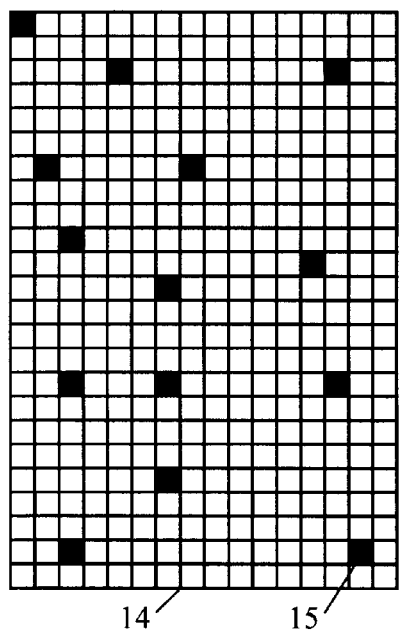
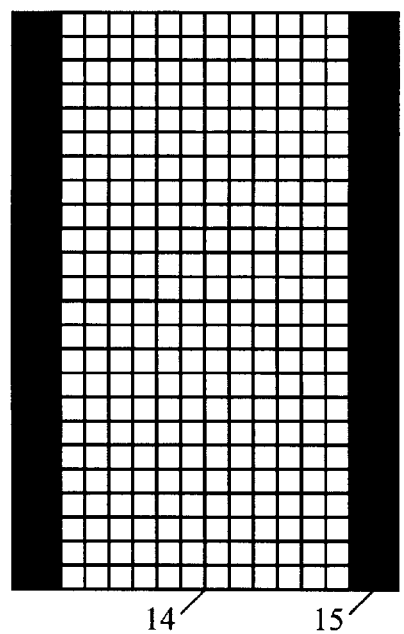
FIG. 2A  FIG. 2B

20 ms

Pre heating pulses

TRIGGERING OF SOLID STATE X-RAY IMAGERS WITH NON-DESTRUCTIVE READOUT CAPABILITY

FIELD OF THE INVENTION

The present invention relates to an improved method for triggering of X-ray imaging sensors. In particular, the invention relates to a method for triggering of an X-ray imaging sensor using a non-destructive readout capability of the sensor.

BACKGROUND OF THE INVENTION

Electronic image sensors, such as charge-coupled device (CCD) or complementary metal oxide semiconductor (CMOS) pixel sensors, are replacing film as X-ray sensitive elements in dental and medical applications. Examples of use of CCD-type and other X-ray image sensors in dental and/or medical environments are described in U.S. Pat. Nos. 5,671,738 and 5,744,806, which are incorporated herein by reference.

In a typical configuration of an X-ray imaging system, the object to be imaged is placed between an X-ray generator and the image sensor. The image sensor registers the amount of radiation passing through the object. A concern in such an application of an X-ray sensor is to synchronize the image capture sequence of the image sensor with the output of the X-ray generator.

It is well known in the art that a dark signal accumulates in the sensor even when it is not exposed to X-rays. The dark current adds noise and reduces the dynamic range of the sensor. The dark signal is dependent on temperature and integration time. Since all electronic image sensors are subject to dark current, many techniques have been proposed to address the dark signal problem.

Methods of compensating for the dark signal in an X-ray image sensor are described in, for example, U.S. Pat. No. 5,519,437, which is incorporated herein by reference.

To minimize dark signal remnants, the sensor may be cleared of signal just prior to the onset of radiation and read out immediately after the end of the radiation pulse. Also, it is desirable to make the image acquisition period as short as possible.

Several approaches have been taken to address the synchronization concern. Methods known in the art for triggering an X-ray image sensor are described in, for example, U.S. Pat. No. 6,002,742, which is incorporated herein by reference.

In one known arrangement, the image sensor is electrically connected to the X-ray source and image acquisition is controlled by a timer of the X-ray source. The disadvantage of such an arrangement is that the image sensor can only be used together with a limited number of different X-ray sources since the connection between X-ray source and image sensor is not sufficiently standardized.

In a second arrangement, one or more supplementary X-ray sensing elements are located close to the imaging area to detect start and end of the X-ray pulse. A signal is sent from the supplementary sensing element to the control circuitry of the image sensor to control image acquisition. The use of supplementary sensing elements adds size and complexity to the image sensor arrangement. The supplementary sensing elements also have to cover a significant part of the image area to minimize the risk of being shaded by a dense part of the object to be imaged.

In a third arrangement, the image sensor itself is continuously read out while waiting for exposure. The signal, either from one pixel or summed from many pixels, is compared to a fixed or variable threshold to determine the onset of radiation. A disadvantage of this method, as used with, for example, CCD sensors, is that the readout is destructive and requires shifting of the image along the sensor. In arrangements with short exposure times the method causes loss of signal and image smearing. It is not possible to determine end of exposure using this arrangement in a system having an image sensor with destructive readout.

SUMMARY OF THE INVENTION

It is an objective of this invention to provide an improved method for the triggering of X-ray sensors.

Another objective of this invention is to provide a method for the triggering of X-ray sensors that requires minimal adaptation in order to be used with any of the known X-ray sources.

Yet another objective of this invention is to provide a method for the triggering of X-ray sensors that does not increase the size and complexity of the image sensor arrangement.

It is also an objective of this invention to provide a method for the triggering of X-ray sensors that is affected minimally by the risk of being shaded by a dense part of an object to be imaged.

It is yet another objective of this invention to provide a method for the triggering of X-ray sensors that does not cause loss of signal and/or image smearing.

In accordance with the present invention, a method for synchronizing an image capture sequence of an X-ray imaging system with an output from an X-ray source, the imaging system having a solid state radiation sensor with non-destructive readout of a plurality of pixels arranged in columns and rows, comprises the steps of randomly selecting reference pixels from the plurality of pixels of the detector, reading out each of the reference pixels regularly at a predetermined waiting time interval, and generating a start-of-exposure signal if the readout signal, integrated over the predetermined waiting time interval, at a predetermined number of the reference pixels exceeds a predetermined reference signal level.

Alternatively, the start-of-exposure signal may be generated if a rate of increase in the readout signal at the predetermined number of the reference pixels exceeds a predetermined reference rate.

The method may further comprise the steps of reading out the reference pixels at a second regular time interval after the start-of-exposure signal is generated, and comparing a rate of increase in the signal read out from the reference pixels with a predetermined rate value, and generating an end-of-exposure signal at least a second predetermined time interval after determining that the rate of increase in the signal read out from a second predetermined number of the reference pixels falls below a predetermined rate value. If the X-ray source is AC-coupled, the second predetermined time interval may be set according to a maximum time between pulses in the AC-coupled X-ray source.

Alternatively, the end-of-exposure signal may be generated a maximum expected exposure time interval after the start-of-exposure signal is generated.

A predetermined number of rows or columns located in at least two different areas of the sensor may be selected as the reference pixels.

These and other objectives and advantages of the invention would be apparent from the specification as a whole.

BRIEF DESCRIPTION OF THE DRAWINGS

The above and numerous other objectives, features and advantages that may be achieved by the present invention would be more readily understood from the following detailed description by referring to the accompanying drawings wherein:

FIG. 1 shows a schematic view of an X-ray imaging system which uses an X-ray image sensor;

FIG. 2A shows a schematic view of selected reference pixels in accordance with one embodiment of the present invention;

FIG. 2B shows a schematic view of selected reference pixels in accordance with another embodiment of the present invention;

DETAILED DESCRIPTION OF THE INVENTION

Figure 3:
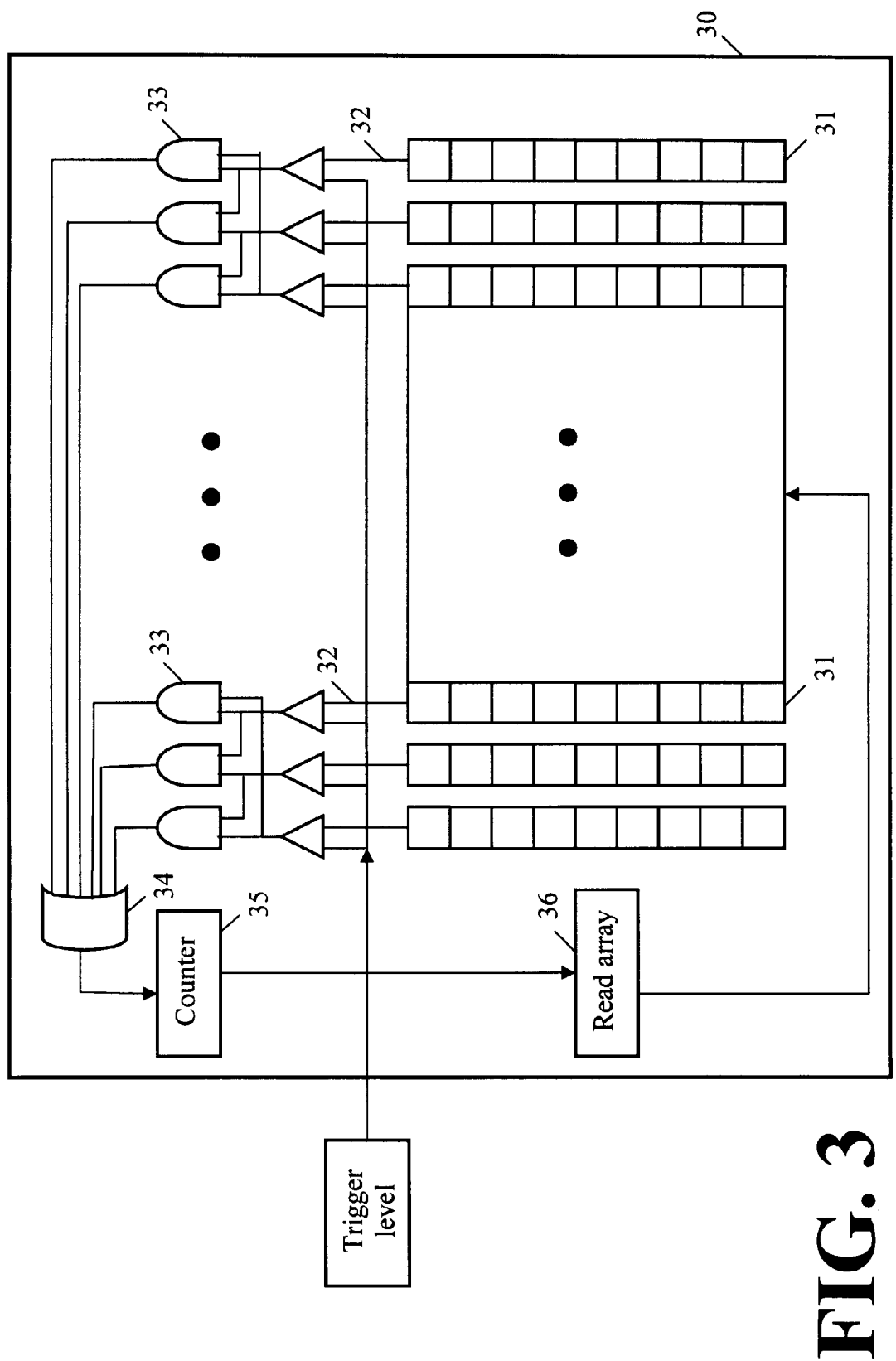
FIG. 3 shows a schematic view of means for image capture in an X-ray image sensor in accordance with an embodiment of the present invention.

To explain the invention, some embodiments are described in connection with the drawings and their supporting descriptions provided below. It should be understood, however, that the invention is not limited to the precise embodiments shown in the drawings and described below and that various changes and modifications thereof could be effected by one skilled in the art without departing from the spirit or scope of the invention.

FIG. 1 shows an X-ray imaging system (1) with an X-ray generator (11) emitting X-rays. The X-ray source (11) is arranged to irradiate an object to be imaged (12). Part of the X-rays are absorbed by the object to be imaged (12). An image sensor (13) is located behind that object. The X-ray photons which pass through the object are detected by the image sensor (13). The image sensor (13) should be one of the X-ray image sensors that has non-destructive readout capability. Such sensors include charge injection device (CID) sensors, CMOS sensors, active column sensors, and other active pixel sensors.

As shown in FIGS. 2A and 2B, the image sensor (13) comprises an array of pixels (14) organized in rows and columns, row and column addressing circuits (not shown) and at least one readout amplifier (also not shown). A number of pixels are designated reference pixels (15). Additional circuitry (not shown) on the chip selects pixels (15) distributed over the chip and compares their signal with a reference level. When a sufficient number of pixels have reached the threshold the image capture starts.

The reference pixels (shaded in the drawings) may be selected either completely randomly distributed over the entire sensor area (as shown, for example, in FIG. 2A) or randomly distributed in selected different rows or columns. Selection of the reference pixels may be performed by software, hardware or a combination.

In one embodiment, as shown in FIG. 2B, two sets of columns are selected as reference pixels. The sets of columns are preferably on opposite sides of the imaging array. An average of the pixel values along a column is taken.

FIG. 3 shows a schematic view of image capture circuitry 30 in an active column sensor, in accordance with a preferred embodiment of the present invention. Note, however, that it would be apparent to one skilled in the art that the present invention may be practiced using other types of X-ray sensors, such as CID, CMOS and other active pixel sensors, having a non-destructive readout capability as well.

The active column sensor has a plurality of columns of pixels, although only the two sets of columns selected as reference pixels are shown in FIG. 3. Each set comprises three columns 31. The means for selecting the reference pixels is not shown in FIG. 3. As suggested above, such means may be hardware circuits, software or a combination, and would be within the knowledge and at the discretion of one skilled in the art.

Preferably all the charge in each of the selected columns is averaged together for one low noise signal 32 per column. Two sets of three columns are logically compared to determine whether at least two out of three columns of summed charges in each set exceeds a predetermined threshold level. Boolean logic units 33 and 34 are used to verify that two out of three columns have exceeded the predetermined threshold level. The Boolean logic units also eliminate (i) any individual pixel defects from lowering device yields and (ii) lower frequency noise sources. Either set of three columns may trigger a counter 35 that then would count down a minimum of 800 milliseconds before causing one frame of video to be read out by block 36. The selected columns of pixels are reset at a 10 Hz frame rate to eliminate any possibility of dark current build up while waiting for an X-ray event.

Because the sensor is random access, only the pixels that are used for threshold testing (i.e. to determine that an X-ray event occurred) are read out, while the rest of the array is held in reset to eliminate any dark current build-up. Another benefit of random access is that the unused pixels are not clocked and therefore power is conserved. The selected columns are the only pixels that are monitored while waiting for an X-ray event, which allows for a higher than normal frame rate ($\geq 10$ Hz) to monitor and quickly respond to an X-ray event.

Figure 4:
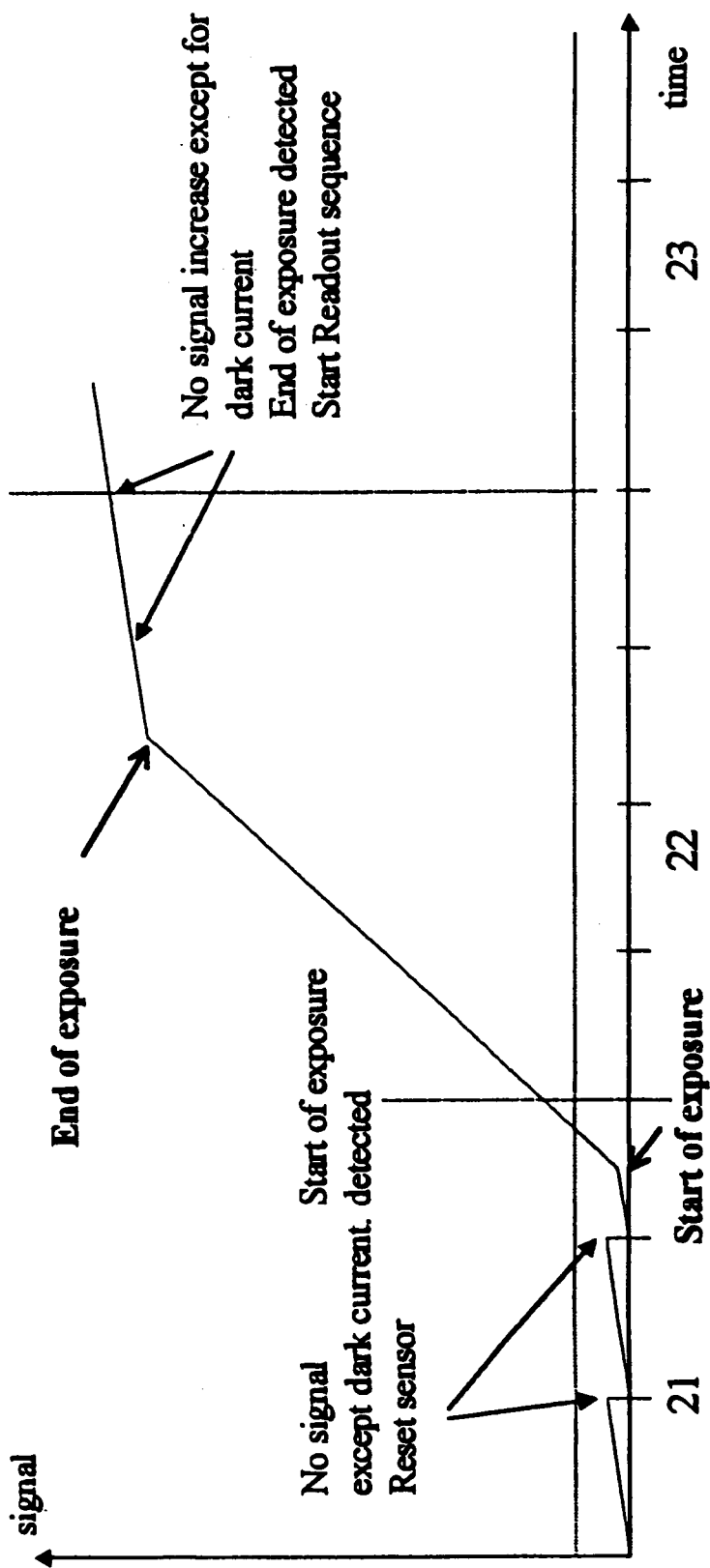
FIG. 4 shows a schematic view of an image capture sequence in accordance with an embodiment of the present invention.

FIG. 4 shows a typical image capture sequence. During the wait for exposure period (21) the signal is monitored and the image sensor is reset at regular intervals. When the signal reaches the threshold level image capture (22) begins. After a specified time interval or when the signal on the reference pixels is no longer increasing the image is read out (23).

During "wait for exposure" the reference pixels are compared with the threshold one by one. If, after a predetermined time interval, a predetermined number of reference pixels are above the threshold then a decision is taken that exposure has started. If none or too few of the reference pixels are above the threshold then the entire array is reset and a new scan for reference pixels above the threshold is started. The system then enters "exposure" mode. The threshold on the reference level may be replaced by a circuit monitoring the rate of increase in the signal at the reference pixels. A similar sequence of operation is still required to prevent the pixels from filling by the dark current.

The "end of exposure" condition may be detected in one of two ways. In the simplest configuration a timer is started when the system enters "exposure" mode. That timer is preset to a value which is slightly longer than the longest exposure time used with the system. The "end of exposure" condition is then reached when the timer expires. For applications always using short exposure times this arrangement is sufficient since the extra delay caused by always expecting the maximum exposure time is not noticed by the user and does not cause any significant increase in the parasitic signal caused by the dark current.

The second method to monitor end of exposure is to monitor the increase in signal on the reference pixels. The reference pixels are monitored at regular intervals. As long as the current value of the reference pixel differs from the previous value by an amount which is larger than the increase caused by the dark current then "exposure" mode is maintained. When the signal in the pixel is no longer increasing then "end of exposure" is reached.

A typical exposure sequence is as follows:

(1) Reset the sensor to clear all the pixels;

(2) Wait for a specified time interval, such as 100 $\mu$s to 100 ms;

(3) For each reference pixel, read the pixel and compare the signal level of the pixel to a threshold;

(4) If the signal is lower than the threshold, return to step (1);

(5) For each reference pixel, read the pixel again, and compare the current signal level of the pixel to the previous value;

(6) If the value is increasing (at greater than a rate of a dark current), return to step (5);

(7) Wait for at least 20 ms (in the case of an AC X-ray source); and (8) Commence readout or return to step (5).

Figure 5A:
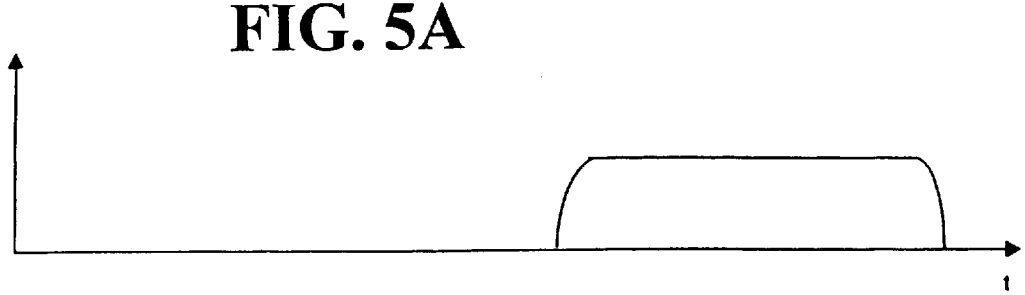
FIGS. 5A through 5C show output characteristics of respective exemplary X-ray sources.
Figure 5B:
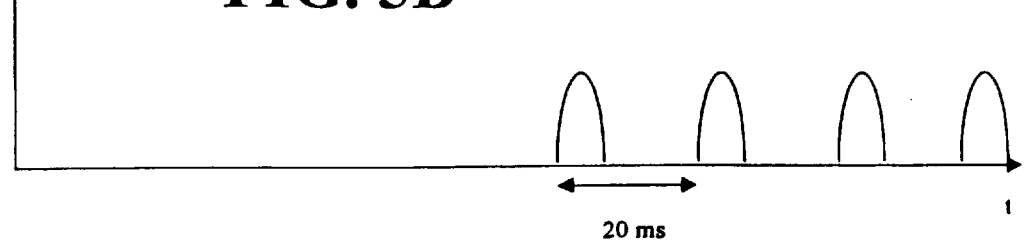
Figure 5C:
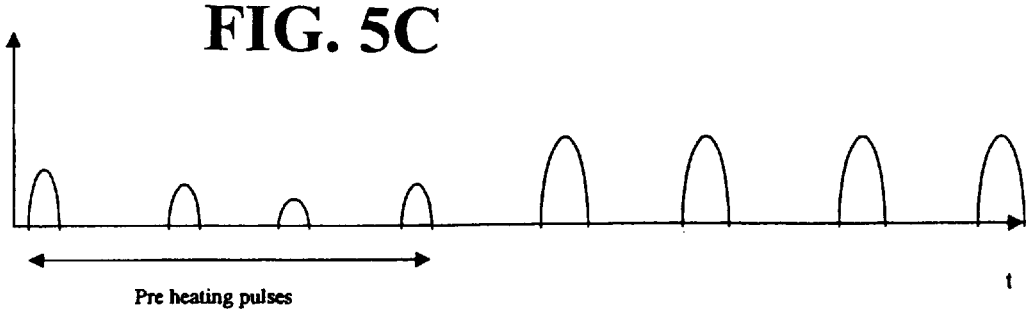

Due to the difference in output characteristics amongst different X-ray generators, as shown for example in FIGS. 5A through 5C, a time delay has to be used [step (7)] before it is determined to be end of exposure.

In a DC-coupled X-ray generator the anode voltage is controlled by a high voltage rectifier, which supplies a constant voltage to the anode of the X-ray tube, as shown in FIG. 5A. The output from the X-ray generator is then a steady flux of X-ray photons from start of exposure to end of exposure.

In AC-coupled X-ray generators the anode current is supplied from a high voltage transformer. The X-ray tube itself acts as a rectifier and outputs a burst of X-ray photons for each half period of the input line frequency (50 Hz in FIG. 5B). Additionally some AC-tubes might also output a couple of weak "pre-heating" pulses before the real exposure begins, as shown in FIG. 5C. The pre-heating pulses are much weaker than the real pulses and can cause a false trigger signal. Any additional pre-heating pulses are then too weak to maintain exposure status.

In order to wait for the real end of exposure a retriggerable timer should be used, which delays the "end of exposure" condition for a specified number of periods of the line frequency. In critical applications, the timer should be software controlled and set to the minimum value required by the specific tube.

The same reference pixels may be used both to detect start of exposure and to detect end of exposure. Alternatively, different reference pixels may be used for detecting end of exposure. As a third option, different reference pixels may be selected periodically. Further, in the preferred embodiment, the same reference pixels used to test for start of exposure are used as well to test for end of exposure. There is no requirement that this be so. Different reference pixels may be used to test for end of exposure. As noted above, the means for selecting the reference pixels using any of these schemes, regardless of whether it is implemented as hardware circuits, software or a combination, would be within the knowledge and at the discretion of one skilled in the art.

Figure 6:
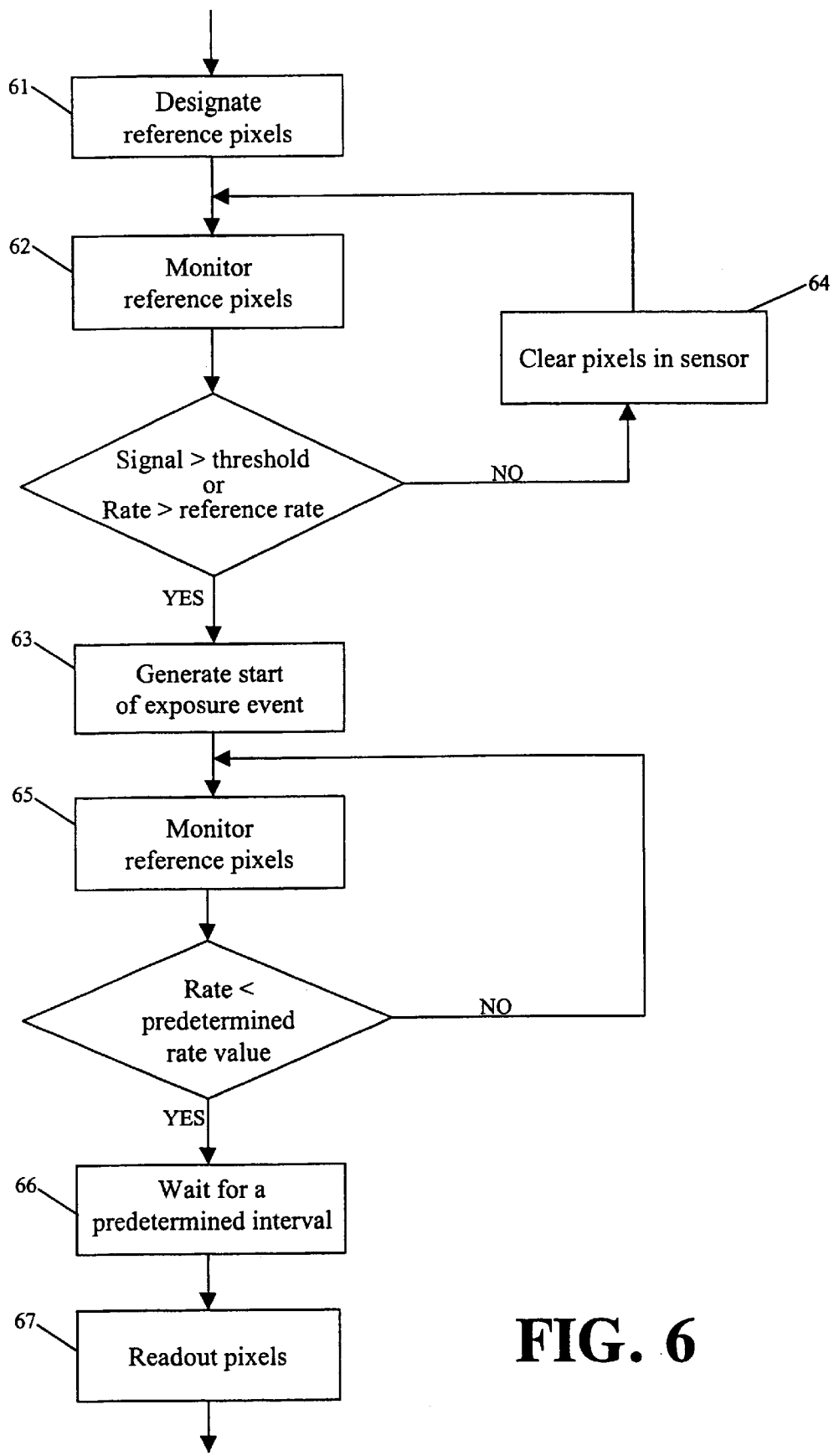
FIG. 6 shows a flow chart of a method in accordance with one embodiment of the present invention.

FIG. 6 shows a flow chart for a method for synchronizing an image capture sequence of an X-ray imaging system with the output from an X-ray source, in accordance with the present invention. The imaging system comprises a solid state radiation detector with a capability of non-destructive readout of pixels arranged in rows and columns.

In step 61, a number of randomly distributed pixels are designated reference pixels. The distribution of pixels may be either totally random or in a limited number of rows or columns. The reference pixels should be well distributed to avoid missed exposures caused by shading of the reference pixels by dense objects. The predetermined reference pixels or pixel like elements may be located in rows or columns distributed in at least two different locations on the sensor. Preferably, a predetermined number of rows or columns located in at least two different areas of the sensor are selected as the reference pixels.

To determine commencement of exposure the reference pixels are continuously monitored for signal in step 62. A signal is integrated over a predetermined time interval at each of the reference pixels. The signal readout from each reference pixel is compared with a predetermined threshold.

If it is determined that the signal level in a minimum number of pixels exceeds a predetermined threshold, a start of exposure event is generated in step 63 and an image capture sequence starts. Otherwise, the entire image sensor is cleared in step 64 and the monitoring for signal continues. The threshold level is set to prevent accidental triggering by dark current at all operating temperatures of interest. The start of exposure event also may be generated when a rate of increase in the signal at the predetermined minimum number of reference pixels exceeds a predetermined reference level.

Following the start of exposure event, change in the accumulated signal at the reference pixels is monitored in step 65. If the X-ray pulse has terminated then the signal no longer changes and readout can be initiated. Thus, if it is determined that a rate of increase in the signal at a predetermined number of reference pixels falls below a predetermined rate value, then, after waiting for a predetermined waiting time interval in step 66, an end of exposure event is generated in step 66. The waiting time interval is set according to a maximum time between pulses in an AC coupled system.

Alternatively, the end of exposure event may be generated a maximum expected exposure time interval after the start of exposure event.

While embodiments of the present invention have been described in detail above, it should be understood that the invention is not limited to the precise embodiments described. Various changes and modifications thereof could be effected by one skilled in the art without departing from the spirit or scope of the invention recited in the appended claims. Improvements and modifications which become apparent to persons of ordinary skill in the art after reading this disclosure, the drawings and the appended claims are deemed within the spirit and scope of the present invention.

What is claimed is:

1. A method for synchronizing an image capture sequence of an X-ray imaging system with an output from an X-ray source, the imaging system having a solid state radiation sensor with non-destructive readout of a plurality of pixels arranged in columns and rows, comprising the steps of:

(a) randomly selecting a plurality of reference pixels from the plurality of pixels of the detector;

(b) reading out each of the plurality of reference pixels regularly at a predetermined waiting time interval; and (c) generating a start-of-exposure signal if the readout signal, integrated over the predetermined waiting time interval, at a predetermined number of the plurality of reference pixels exceeds a predetermined reference signal level.

2. The method of claim 1, further comprising the steps of:

(d) reading out the plurality of reference pixels at a second regular time interval after step (c);

(e) comparing a rate of increase in the signal read out in step (d) with a predetermined rate value; and (f) generating an end-of-exposure signal at least a second predetermined time interval after determining in step (e) that the rate of increase in the signal read out in step (d) from a second predetermined number of the plurality of reference pixels falls below a predetermined rate value.

3. The method of claim 2, wherein the X-ray source is AC-coupled and the second predetermined time interval is set according to a maximum time between pulses in the AC-coupled X-ray source.

4. The method of claim 1, further comprising the step of:

generating an end-of-exposure signal a maximum expected exposure time interval after step (c).

5. The method of claim 1, wherein a predetermined number of rows or columns located in at least two different areas of the sensor are selected as the reference pixels.

6. The method of claim 5, further comprising the step of:

generating an end-of-exposure signal a maximum expected exposure time interval after step (c).

7. A method for synchronizing an image capture sequence of an X-ray imaging system with an output from an X-ray source, the imaging system having a solid state radiation sensor with non-destructive readout of a plurality of pixels arranged in columns and rows, comprising the steps of:

(a) randomly selecting a plurality of reference pixels from the plurality of pixels of the detector;

(b) reading out each of the plurality of reference pixels regularly at a predetermined waiting time interval; and (c) generating a start-of-exposure signal if a rate of increase in the readout signal at a predetermined number of the plurality of reference pixels exceeds a predetermined reference rate.

8. The method of claim 7, further comprising the steps of:

(d) reading out the plurality of reference pixels at a second regular time interval after step (c);

(e) comparing a rate of increase in the signal read out in step (d) with a predetermined rate value; and (f) generating an end-of-exposure signal at least a second predetermined time interval after determining in step (e) that the rate of increase in the signal read out in step (d) from a second predetermined number of the plurality of reference pixels falls below a predetermined rate value.

9. The method of claim 8, wherein the X-ray source is AC-coupled and the second predetermined time interval is set according to a maximum time between pulses in the AC-coupled X-ray source.

10. The method of claim 7, further comprising the step of:

generating an end-of-exposure signal a maximum expected exposure time interval after step (c).

11. The method of claim 7, wherein a predetermined number of rows or columns located in at least two different areas of the sensor are selected as the reference pixels.

12. The method of claim 11, further comprising the step of:

generating an end-of-exposure signal a maximum expected exposure time interval after step (c).

* * * * *